United States Patent [19]

Haluska

[11] Patent Number: 4,861,532
[45] Date of Patent: Aug. 29, 1989

[54] METHOD OF PREPARING CERAMICS FROM POLYMERS DERIVED FROM CYCLIC SILAZANES, AND HALOSILANES

[75] Inventor: Loren A. Haluska, Midland, Mich.

[73] Assignee: Dow Corning Corporation, Midland, Mich.

[21] Appl. No.: 141,647

[22] Filed: Jan. 4, 1988

Related U.S. Application Data

[62] Division of Ser. No. 926,607, Nov. 4, 1986, Pat. No. 4,742,143.

[51] Int. Cl.$^4$ ............................................. C04B 35/58
[52] U.S. Cl. ........................................ 264/65; 501/92
[58] Field of Search ............................ 264/65; 501/92

[56] References Cited

U.S. PATENT DOCUMENTS

| | | | |
|---|---|---|---|
| 2,448,556 | 6/1948 | Sprung et al. | 528/31 |
| 2,547,678 | 4/1951 | Wilcock | 528/31 |
| 2,579,418 | 12/1951 | Cheronis | 528/39 |
| 3,007,886 | 11/1961 | Parker | 556/412 |
| 3,393,218 | 7/1968 | Van Wazer et al. | 528/28 |
| 4,482,669 | 11/1984 | Sayferth et al. | 525/474 |
| 4,482,689 | 11/1984 | Haluska | 556/412 |
| 4,543,344 | 9/1985 | Cannady | 264/65 |
| 4,668,642 | 5/1987 | Bujalski | 501/92 |

*Primary Examiner*—James Derrington
*Attorney, Agent, or Firm*—James E. Bittell

[57] ABSTRACT

This invention deals with new and novel polysilazane polymers, a method for their preparation, and the ceramic materials prepared thereby. An example of such a material is one which is prepared by the reaction of $HSiCl_3$ and $\{(CH_3)_2SiNH\}_x$.

5 Claims, No Drawings

METHOD OF PREPARING CERAMICS FROM POLYMERS DERIVED FROM CYCLIC SILAZANES, AND HALOSILANES

This is a divisional of co-pending application Ser. No. 926,607 filed on Nov. 4, 1986, now U.S. Pat. No. 4,742,143.

BACKGROUND OF THE INVENTION

This invention deals with new and novel polysilazane polymers, a method for their preparation, their use to prepare ceramic materials and the ceramic materials prepared thereby. Said invention resides in the use of certain cyclic silazanes or mixtures of such cyclicsilazanes with halogen-containing monosilanes to give the unique polysilazane polymers.

Since about 1975, there has been a renewed effort in the synthesis of preceramic polymers owing to the fact that such polymers have handling properties which allow the formation of shapes and forms prior to ceramification. Thus, several different methods have been developed and disclosed for the preparation of polysilazane polymers that can be converted to silicon nitrogen-containing ceramics and other related materials.

The first reported method was that of Verbeek in U.S. Pat. No. 3,853,567, issued on Dec. 10, 1974, in which methyltrichlorosilane was reacted with methylamine to form methyltris(methylamino)silane. This product could be heated to form a polymer at 520° C. The polymers could then be cured by moist air oxidation at 110° C. and then pyrolyzed to afford a low yielding Si—C—N—O ceramic. Similar materials and techniques were disclosed by Verbeek et. al. in U.S. Pat. No. 3,892,583, issued July 1, 1975.

Some time later, Gaul, in U.S. Pat. No. 4,312,970, issued Jan. 26, 1982, disclosed the preparation of polysilazane polymers that were synthesized by reacting various alkyltrichlorosilanes with a disilazane, such as, {(CH$_3$)$_3$Si}$_2$NH. In this synthesis, (CH$_3$)$_3$SiCl was eliminated as a by-product. These materials could be pyrolyzed at high temperatures to form Si—C—N containing ceramics.

In addition, Gaul, in U.S. Pat. No. 4,404,153 issued July 20, 1982, obtained ceramics materials by pyrolysis of preceramic silazane polymers, which polymers were prepared by reacting chlorine-containing disilanes and disilazanes. These polymers were pyrolyzable to Si—C—N ceramics and prior to pyrolysis, the polymers were capable of being molded, i.e., one could form such shapes as fibers from such polymers.

In another approach, Cannady in U.S. Pat. No. 4,543,344, issued Sept. 24, 1985, prepared polymers by reacting HSiCl$_3$ and disilazanes. These materials were capable of being pyrolyzed to Si—C—N alloyed ceramics.

Cannady, later, in U.S. Pat. No. 4,540,803, issued Sept. 10, 1985, described a modification to Gaul's process to include the preparation of a polyhydridomethylsilazane polymer from trichlorosilane and hexamethyldisilazane.

Additional polymers have been developed and disclosed by Gaul in U.S. Pat. No. 4,395,460, issued July 26, 1983; U.S. Pat. No. 4,404,153, issued Sept. 13, 1983; Haluska in U.S. Pat. No. 4,482,689, issued Nov. 13, 1984; Seyferth, et al. in U.S. Pat. No. 4,397,828, issued Aug. 9, 1983; and 4,482,669 issued Nov. 13, 1984; Cannady in U.S. Pat. No. 4,535,007, issued Aug. 13, 1985; Bujalski in U.S. patent application Ser. No. 653,003, filed Sept. 21, 1984, now abandoned; Baney, et al. in U.S. patent application Ser. Nos. 652,938, filed Sept. 21, 1984, now abandoned and 653,939, filed Sept. 21, 1984 now abandoned.

What has been discovered are new and novel preceramic polymers, methods for their preparation, their use to prepare ceramic materials and the ceramic materials prepared using such preceramic polymers.

THE INVENTION

This invention relates to a method of preparing preceramic polymers, which method comprises contacting and reacting in an inert essentially anhydrous atmosphere, a halogen-containing monosilane or a mixture of halogen-containing monosilanes having the general formula $$R_c'SiX_{(4-c)}$$

with a cyclic silazane or a mixture of cyclic silazanes selected from the group consisting of silazanes having the general formula (i)(CH$_3$R″SiNH)$_x$ and (ii)(C$_6$H$_5$R′SiNH)$_x$ at a temperature in the range of 0° to 260° C. while distilling by-produced volatile products, wherein R40 and R″ are each independently selected from the group consisting of hydrogen, vinyl, phenyl and alkyl radicals containing 1 to 3 carbon atoms; c has a value of 1 or 2; and x has a value of 3 to 6 and X is a halogen atom.

This invention further comprises the method by which the product obtained by such a preparative method is further treated with ammonia to reduce the residual halide in such a polymer.

Also, this invention deals with the products produced by the preparative method for the preceramic polymers and the products produced by the ammonia treatment of such polymers.

In addition, this invention deals with a method of forming a ceramic material, which method comprises pyrolyzing the preceramic polymer, or the ammonia treated preceramic polymer, at elevated temperatures, in a vacuum, or an inert atmosphere until the preceramic polymer or the ammonia treated preceramic polymer is converted to a ceramic material.

Finally, this invention deals with the ceramic composition prepared by pyrolyzing the inventive compositions herein.

The preceramic polymers of this invention, including those not treated with ammonia, have improved flow characteristics over those materials of the prior art. It was discovered that the incorporation of significant amounts of dimethylsilazane, —SiMe$_2$NH—, substituted into the polymer rather than trimethylsilazane, Me$_3$SiNH—, improves the flow characteristics. It is believed by the inventor herein that such a benefit is due to enhanced polymer chain flexibility.

Thus, the preparation of the new polymers involve the reaction of (CH$_3$R″SiNH)$_x$, or (C$_6$H$_5$R″SiNH)$_x$, or a mixture of these cyclic silazanes, with halosilanes such as HSiCl$_3$ to eliminate RR″SiCl$_2$ wherein R and R″ are individually CH$_3$ or C$_6$H$_5$, as a by-product during the polymerization reaction to form the preceramic polymer. The remaining halide substitution on silicon can then be removed by reacting with gaseous ammonia.

It is theorized, but the inventor does not wish to be held to such a theory, that the following reactions take place, using HSiCl₃ and {(CH₃)₂SiNH}₃ as the reactants by way of example:

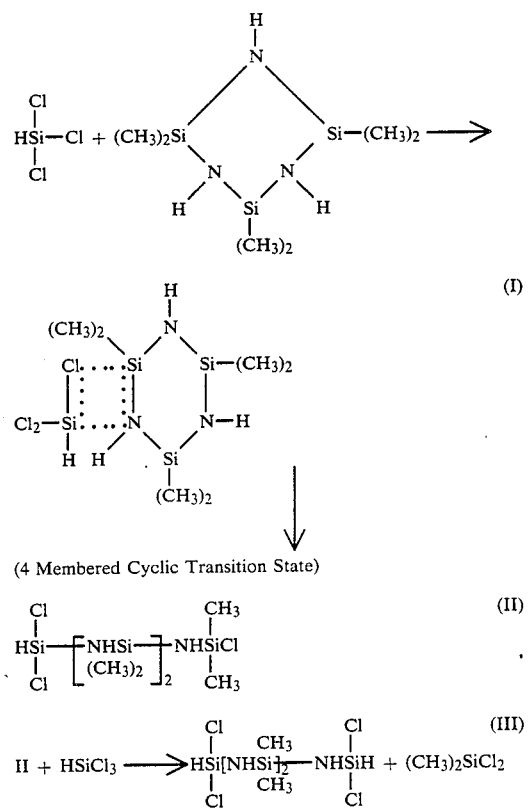

(4 Membered Cyclic Transition State)

  (II)

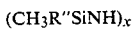
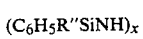  (III)

The residual chloride can then be essentially removed by treatment with gaseous ammonia, viz.

III+NH₃→≡SiNH₂+NH₄Cl↓ .

Generally, the reaction of the silane and cyclic silazane is carried out in the presence of a solvent such as toluene. The solvent is not critical as any organic solvent that allows the compatibility of the reactants, without reacting with the silanes or the cyclic silazanes, can be used in this invention. Generally, since the initial reaction is exothermic, it is desirable to cool the reaction vessel as the reaction proceeds. Although it is not essential, it is preferred to add the silanes to the cyclic silazanes wherein the silazanes are cooled, such as by an ice water bath.

The amount of silane that can be reacted with the cyclic silazane is based on the stoichiometry of the total available halide in the silanes and the total available reactive nitrogen in the cyclic silazanes. Thus, preferred for this inventive method is a ratio of 1 equivalent of HSiCl₃ to 2.75 equivalents of {(CH₃)₂SiNH}ₓ. Other ratios of HSiCl₃ to {(CH₃)₂SiNH}ₓ can be used that are higher or lower as long as the final product is soluble in organic solvents such as toluene, n-heptane, etc.

The reaction mass should be essentially dry as water tends to interfere with the desired result. After the silane has been added to the cyclic silazane and the initial exotherm has subsided, the cooling source is removed and the reaction is allowed to proceed at or near room temperature for a period of one to several hours depending on the silanes and cyclic silazanes used in the reaction. The reaction mass is then strip distilled to remove volatile by-products and to form the polymer. Preferred strip distillation temperature is in the range of 22° C. to 260° C. The polymer so-formed can then be filtered, stored or treated with gaseous ammonia to reduce the residual halide content. Further, it is appropriate to refilter the polymer after the gaseous ammonia treatment to remove the solid NH₄Cl that forms therein.

The polymers range from solids to liquids and are light to dark yellow in color.

Monosilanes useful in this invention are those having the general formula $R_c'SiX_{(4-c)}$ wherein R' is selected from the group consisting of hydrogen, vinyl, phenyl and alkyl radicals containing 1 to 3 carbon atoms and c has a value of 1 or 2 and X is halogen.

Thus, the monosilanes having the specific formulas HSiCl₃, CH₃SiCl₃, C₆H₅SiCl₃, CH₂=CHSiCl₃, CH₃CH₂SiCl₃ or CH₃(CH₂)₂SiCl₃ and double organic substituted silanes such as (CH₃)₂SiCl₂, (C₂H₅)₂SiCl₂ and (CH₂=CH)(CH₃)SiCl₂ are examples of the silanes useful in this invention. Preferred in this invention are the silanes HSiCl₃, CH₃SiCl₃, CH₂=CHSiCl₃ and CH₃(CH₂=CH)SiCl₂. Most preferred are the silanes HSiCl₃ and CH₃SiCl₃.

Mixtures of the above silanes can also be used in this invention. For example CH₃SiCl₃ and CH₂=CHSiCl₃ can be used to give a heterogenous polymer having vinyl functionality. The number of units of di-organosubstituted silicon atoms should not exceed the number of units of monoorgano-substituted silicon atoms. Even though silazane polymers can be formed from reactants wherein the di-organo-substituted units exceed the number of monoorgano-substituted units, it has been found that these polymers have much less desirable properties.

The cyclic silazanes useful in this invention are those having the general formulae (CH₃R″SiNH)ₓ    (i)

(C₆H₅R″SiNH)ₓ    (ii)

wherein R″ is selected from the group consisting of hydrogen, vinyl, phenyl and alkyl radicals containing 1 to 3 carbon atoms and x has a value of 3, 4, 5 or 6. Preferred for this invention are those cyclic silazanes wherein x has a value of 3 or 4 and R″ is methyl, vinyl, or phenyl. Most preferred are those cyclic silazanes wherein x has a value of 4 and R″ is methyl.

Mixture of cyclic silazanes can be used. By "mixture", it is meant for purposes of this invention that the cyclics can be mixtures wherein x has the value of 3 and 4, or x has a value of 3, 4 and 5, etc. Generally, the cyclic silazanes are used in such mixtures wherein the cyclic tetramer predominates, that is, the cyclic tetramer is present in the mixture in more than fifty weight percent. "Mixtures" can also mean that, for example, cyclic tetramers having different substituents on silicon can be used. For example {(CH₃)₂SiNH}₄ and {CH₃(CH₂=CH)SiNH}₄ can be used together to give mixed polymers.

This invention also deals with a method of preparing ceramic materials, the method comprising heating a preceramic polymer which has been prepared by contacting and reacting in an inert, essentially anhydrous atmosphere, a halogen-containing monosilane or a mixture of halogen-containing monosilanes having the general formula $$R_c'SiX_{(4-c)}$$

with a cyclic silazane or a mixture of cyclic silazanes selected from the group consisting of silazanes having the general formula (i) $(CH_3R''SiNH)_x$ and (ii) $(C_6H_5R''SiNH)_x$ at a temperature in the range of 0° to 260° C. while distilling byproduced volatile products, wherein R' and R" are each independently selected from the group consisting of hydrogen, vinyl, phenyl and alkyl radicals containing 1 to 3 carbon atoms; c has a value of 1 or 2; and x has a value of 3 to 6 and X is a halogen, atom in an inert atmosphere or vacuum to a temperature of at least 750° C. until said preceramic polymer is converted to a ceramic material.

Further, this invention deals with a method of preparing ceramic materials wherein a preceramic polymer is prepared by (I) contacting and reacting in an inert, essentially anhydrous atmosphere, a halogen-containing monosilane or a mixture of halogen-containing monosilanes having the general formula $$R_c'SiX_{(4-c)}$$

with a cyclic silazane or a mixture of cyclic silazanes selected from the group consisting of silazanes having the general formula (i) $(CH_3R''SiNH)_x$ and (ii) $(C_6H_5R''SiNH)_x$ at a temperature in the range of 0° to 260° C. while distilling by-produced volatile products, wherein R' and R" are each independently selected from the group consisting of hydrogen, vinyl, phenyl and alkyl radicals containing 1 to 3 carbon atoms; c has a value of 1 or 2; and x has a value of 3 to 6 and X is a halogen atom;

(II) treating the product from (I) with dry gaseous ammonia at a temperature in the range of 22° C. to 114° C. to remove essentially all residual halide in the product from (I);

(III) heating the product from (II) in an inert atmosphere or, vacuum or dry ammonia-containing atmosphere to a temperature of at least 750° C. until said preceramic polymer is converted to a ceramic material.

For purposes of this invention, "inert" means the use of gases such as $N_2$, Argon, Helium, Carbon Monoxide or Hydrogen.

Now, so that those skilled in the art can more fully understand and appreciate the invention, the following examples are presented. These examples should not be used to limit the scope of this invention as it is delineated in the claims.

EXAMPLE 1

Polyhydridomethylsilazane from $\{(CH_3)_2SiNH\}_4$.

The preparation of this polymer was carried out by adding 94.7 grams (0.7 moles) of $HSiCl_3$ to an ice water cooled solution of 140.8 grams of $\{(CH_3)_2SiNH\}_4$ (0.48 moles) in 320 cc of dry reagent toluene. The entire addition was completed in 6 minutes and during this time the temperature rose from 6.5° C. to 21° C. The ice bath was removed and the reaction mixture was allowed to stand overnight (about 16 hours). The reaction mixture was then strip-distilled to a pot temperature of 209° C. There was obtained 332.6 grams of distillate that contained 0.41 moles of $(CH_3)_2SiCl_2$ which accounted for 39 weight percent of the chloride in the starting silane. This polymer which was a light yellow colored material was dissolved in 200 cc of dry toluene and dry ammonia gas was bubbled through the solution at temperatures of 23° to 56° to 46° C. over a period of 45 minutes and then the polymer was heated to a final temperature of 114° C. and allowed to cool to room temperature. After filtration, the polymer was isolated in a 65.4 grams yield by strip distillation to a 203° C. pot temperature. The polymer was very light colored and was a solid upon cooling.

The elemental analysis for the polymer showed 55.3 weight percent Si; 22.6 weight percent for carbon; 7.56 weight percent for hydrogen; 22.8 weight percent for nitrogen and nil chloride content, to give a calculated composition of $Si_{2.0} C_{1.9} H_{7.5} N_{1.6}$. The molecular weight of the polymer was obtained by gas phase chromatography analysis with the column calibrated versus polystyrene corrected to a known silazane polymer from the comparative example herein. The weight average molecular weight was 5102.

The softening point of the polymer was determined by heating a sample at 5° C./minute rate in a DuPont 1090 thermal mechanical analyzer. A softening point of 50° C. was obtained for this sample.

EXAMPLE 2

A sample of the polymer prepared in Example 1 was subjected to pyrolysis without precuring. Thermogravimetric analysis of the uncured polymer afforded a 65 weight percent yield of ceramic with pyrolysis to 1000° C. in helium. Weight loss began at about 140° C. and was finished at about 750° C.

A separate sample was pyrolyzed in 4" Lindberg Furnace under argon to 1200° C. over a period of 3 hours to afford a 62 weight percent yield of ceramic char.

X-ray diffraction showed the ceramic to be an amorphous material. The mass absorption coefficient for the ceramic was 34.1. The mass absorption coefficient that was calculated from the elemental analysis of the ceramic material was 37.7.

Analysis of the ceramic material derived at 1200° C. from the polymer showed the following results.

| Element | Weight Percent |
|---------|----------------|
| Si      | 57.6           |
| C       | 14.2           |
| N       | 26.2           |

Thus, the elemental composition of the ceramic was $Si_{2.1} C_{1.2} N_{1.9}$.

The ceramic material had a density of 2.443 grams/cc which was obtained by a Gradient Column Procedure.

EXAMPLE 3

A polymer and then ceramic material was prepared by the prior art method of Cannady according to Example 1 of U.S. Pat. No. 4,543,344 and compared to the materials of the instant invention. See Table I for the polymers and Table II for the ceramics.

TABLE I

| Comparison of the Polymers of the Instant Invention | | | | |
|---|---|---|---|---|
| Polymer Example | Yield/% | Molecular Weight mw | T Ref. °C. | Composition |
| 1 | 27.8 | 5102 | 50 | $Si_{2.0} C_{1.9} N_{1.6} H_{7.5}$ |
| 3 | 14.5 | 1760 | 35–40 | $Si_{1.6} C_{1.9} H_{7.9} N_{1.6}$ |

TABLE II

| | Comparison of the Ceramics of the Instant Invention | | | | | |
|---|---|---|---|---|---|---|
| Ceramic Example | Yield/% | X-ray | MAC* | g/cc Density | psi YM** | Ceramic Composition |
| 2 | 65 | Amorphous | 37.7 | 2.443 | $29.9 \times 10^6$ | $Si_{2.1} C_{1.2} N_{1.9}$ |
| 3 | 57 | Amorphous | N.D. | N.D. | N.D. | |

*Mass absorption coefficient
**Youngs modulus

With regard to the polymer yield based on the weight of the two starting materials, the inventive polymer yield was essentially twice that obtained with the comparative polymer yield. In addition, the ceramic yield of the inventive polymer is also higher than the comparison polymer. The molecular weight of the inventive polymer is about three times greater than that of the comparison polymer and thus the inventive polymer has better flow and processing characteristics.

It was easy to pull fibers from a hot liquid melt of the inventive polymers.

From the above comparison of the properties of the two polymers, it appears that the inventive polymer has the advantages of higher yield, higher molecular weights and better potential control over the softening points.

That which is claimed is:

1. A method of preparing a ceramic material, the method comprising pyrolyzing a preceramic polymer in an inert atmosphere or in a vacuum, to a temperature of at least 750° C., until the preceramic polymer is ceramified and a ceramic material obtained, the preceramic polymer consisting essentially of a polymer prepared by contacting and reacting in an inert, essentially anhydrous atmosphere, a component selected from the group consisting of halogen-containing monosilanes having the general formula $$R'SiX_3$$

and mixtures of halogen-containing monosilanes having the general formula $$R_c'SiX_{(4-c)}$$

wherein c has a value of 1 or 2 and in the mixtures, the number of monosilanes having diorgano-substituted silicon atoms does not exceed the number of monosilanes having monoorgano-substituted silicon atoms, with a cyclic silazane or a mixture of cyclic silazanes selected from the group consisting of silazanes having the general formula (i) $(CH_3R''SiNH)_x$ and (ii) $(C_6H_5R''SiNH)_x$ at a temperature in the range of 0° C. to 260° C. and removing by-produced volatile products by distillation, wherein R' and R'' are each independently selected from the group consisting of hydrogen, vinyl, phenyl and alkyl radicals containing 1 to 3 carbon atoms; x has a value of 3 to 6 and X is a halogen atom.

2. A method as claimed in claim 1 wherein the halogen-containing monosilane is $HSiCl_3$ and the cyclic silazane is $\{(CH_3)_2SiNH\}_x$.

3. A method as claimed in claim 1 wherein the halogen-containing monosilane is $HSiCl_3$ and the cyclic silazanes are a mixture of $\{(CH_3)_2SiNH\}_4$ and $\{(CH_3)_2SiNH\}_3$.

4. A method as claimed in claim 1 wherein the halogen-containing monosilane is $CH_3SiCl_3$ and the cyclic silazane is $\{(CH_3)HSiNH\}_x$.

5. A method as claimed in claim 1 wherein the preceramic polymer is further treated with ammonia in an inert, essentially anhydrous atmosphere.

* * * * *